INVENTOR.
JOHN B. CUNNINGHAM
CHARLES E. WOODDELL
BY

INVENTOR.
JOHN B. CUNNINGHAM
CHARLES E. WOODDELL
BY

INVENTOR.
JOHN B. CUNNINGHAM
CHARLES E WOODDELL
BY

United States Patent Office 2,816,019
Patented Dec. 10, 1957

2,816,019

PROCESS OF INTRODUCING SILICON CARBIDE IN COPPER ORES TO RECOVER COPPER

John B. Cunningham and Charles E. Wooddell, Tucson, Ariz.; Alice K. Wooddell, executrix of said Charles E. Wooddell, deceased Application December 30, 1953, Serial No. 401,228

7 Claims. (Cl. 75—74)

The present invention relates to the metallurgy of copper, and in particular relates to an improved process of extracting copper from copper-bearing materials involving the use of an addition agent.

In the production of copper from its various ores, the ores are smelted to form a matte of mixed copper and iron sulfides in either a blast furnace or in a reverberatory furnace. The matte is then transferred to a converter where metallic copper is formed.

In general, ores that are high in copper are smelted in a blast furnace because they can be introduced in the form of crushed ore of particle size sufficiently large as not to be blown out of the blast furnace. However, ores which are low in copper content must be crushed to relatively fine particle size so that they can be mechanically or otherwise concentrated to a higher copper content. Most of the resulting concentrated ores, which are accounting for an ever greater percentage of copper production, are of too fine a particle size to smelt in a blast furnace. Consequently, in recent years more and more copper ores have been smelted in reverberatory furnaces where there is no danger of blowing any substantial amount of the ore out of the furnace.

In the operation of a reverberatory furnace copper ore, which may be raw concentrate, roasted concentrate, raw natural ore, or a mixture of these, is introduced with or without lime and/or silica into the reverberatory furnace where it is fused and converted to slag and a matte of mixed copper and iron sulfides. The slag from the converters is also introduced into the reverberatory furnace. The copper ore fed to the reverberatory furnace usually consists of a mixture of oxides, sulfides, and sulfates of iron and copper, together with silica and silicates of various metals and earths. By numerous complicated chemical reactions, the ferric oxide is reduced to ferrous sulfide and ferrous oxide, and the copper compounds are converted to copper sulfide. Some magnetite is probably formed by the incomplete reduction of ferric oxide. The ferrous oxide unites with other oxides and silica to form slag. The slag removed from the reverberatory furnace, which usually contains about 0.5% copper, is discarded as waste. The resultant copper and iron sulfides form a molten layer under the slag, which layer constitutes the matte.

The matte is transferred from the reverberatory furnace to converters. Silica is introduced into the converters to form slag. Air in thin streams is forced through the sulfide matte whereby the iron sulfide is oxidized to form iron oxide and sulfur dioxide, the iron oxide entering the silica slag and the sulfur dioxide going off as a gas. When all the iron sulfide has been oxidized so that only copper sulfide remains in the converter matte layer, the iron oxide-silica slag is poured off and transferred to the reverberatory furnace. Further air is then blown through the copper sulfide, forming metallic copper and sulfur dioxide, the latter going off as a gas. The resultant metallic copper, known as blister copper, is then further treated to obtain high purity copper.

The slag removed from the converters usually contains up to about 5% of copper. It also usually contains about 15% to 25%, and even as high as 30% or more, of the iron oxide, magnetite ($Fe_3O_4$). Because of the high percentage of copper in this slag, it is thereafter introduced into the reverberatory furnace, this being the greatest source of magnetite in the reverberatory furnace.

As aforementioned, magnetite is introduced into the reverberatory furnace with the converter slag; it is also formed in the reverberatory furnace to some extent by the incomplete reduction of ferric oxide. When copper ores are roasted, usually a certain amount of magnetite is formed. Consequently, if the ore fed to the reverberatory furnace comprises some roasted ore, the ore itself is usually a third source of magnetite.

The presence of magnetite in the reverberatory furnace is highly undesirable. The specific gravity of magnetite is 5.17, while the specific gravity of copper matte varies from about 4.8 to 5.5, increasing with increased copper content. A matte containing 43 percent copper has a specific gravity practically the same as that of magnetite. The specific gravity of the reverberatory furnace slag is substantially less than that of magnetite. Therefore, since the solubility of magnetite in the slag and matte is limited and since temperature of the material in the reverberatory furnace is not high enough to fuse magnetite, most of the magnetite in the reverberatory furnace is distributed as an unfused layer at the slag-matte interface, in the matte as suspended crystals, or at the bottom of the furnace as solid crystals, the relative amounts of each depending upon the copper content of the matte. Magnetite at the slag-matte interface is undesirable because it interferes with the separation of the matte and slag, causes irregularities in the furnace operation and mechanically entraps a certain amount of matte in the magnetite layer which is discarded along with the slag. Magnetite also favors the formation and retention of copper ferrite in the slag. An additional disadvantage of having magnetite in the reverberatory furnace is that, because of its high melting point, magnetite makes the slag viscous resulting in the entrapment of matte in the slag, which is subsequently discarded as waste. In normal operation the waste reverberatory slag contains about 0.5% copper, which is a very substantial loss of copper because of the great amount of waste slag. Furthermore, magnetite sometimes accumulates at the bottom of the reverberatory furnace to such an extent that it is no longer possible to continue the furnace operation until this magnetite is removed. It is therefore obvious that the presence of magnetite in the reverberatory furnace is highly undesirable.

Attempts have been made to decrease the amount of magnetite in copper furnaces by use of the sulfides of iron or metallic iron as addition agents to reduce the magnetite to ferrous oxide. However, these practices have not proved highly successful. The sulfides of iron present in the ore charge to the reverberatory furnace have neither prevented the accumulation of magnetite at the bottom of the furnace, nor eliminated magnetite from the waste slags from the reverberatory furnace. It has therefore been the finding that iron sulfides and metallic iron do not decrease the amount of magnetite in copper furnaces to the degree necessary to permit optimum furnace operations.

Therefore, it is an object of the present invention to provide a process whereby the amount of magnetite present in copper smelting reverberatory furnaces is decreased.

It is a further object to provide a process whereby the amount or magnetite in slag from converters is decreased.

These and other objects inherent in the practice of the present invention will become apparent as the description proceeds.

In order that the results and advantages attendant the practice of the present invention may be more clearly appreciated, reference is made to the drawings, in which.

The present invention comprises the step in the production of metallic copper from its ores of employing silicon carbide as an addition agent to decrease the amount of magnetite in the reverberatory furnace. The silicon carbide is believed to decrease the amount of magnetite by reacting with it to form ferrous oxide, which in turn forms a silicate slag with silica. The silicon carbide may be added directly to the reverberatory furnace by itself or along with the ore charge or other material, or it may be added to the converter slag either while the slag is in the converter or after the slag has been removed from the converter but before it has been added to the reverberatory furnace.

While the addition of smaller amounts of silicon carbide causes a decrease in the amount of magnetite, better results are obtained when silicon carbide is added in at least the theoretical amount necessary to satisfy the stoichiometric requirements for complete reduction of all the magnetite present, in accordance with chemical Equation 1 below, which is thought to be the reaction which takes place resulting in a decrease in the amount of magnetite:

(1) $6Fe_3O_4 + 2SiC + 7SiO_2 \rightarrow 9(2FeO \cdot SiO_2) + 2CO$

By weight, the theoretical amount of silicon carbide required to completely reduce all the magnetite in accordance with Equation 1 is equal to 5.77% or about $\frac{1}{17}$ the weight of the magnetite present. Better results are therefore obtained when silicon carbide is added in an amount at least equal to $\frac{1}{17}$ the amount of magnetite present. The addition of this amount of silicon carbide results in a large decrease in the amount of magnetite. However, a much larger decrease in the amount of magnetite is obtained when silicon carbide is added in substantial excess of this amount, for example twice or three times the theoretical stochiometric amount necessary to satisfy Equation 1.

Figure 3:
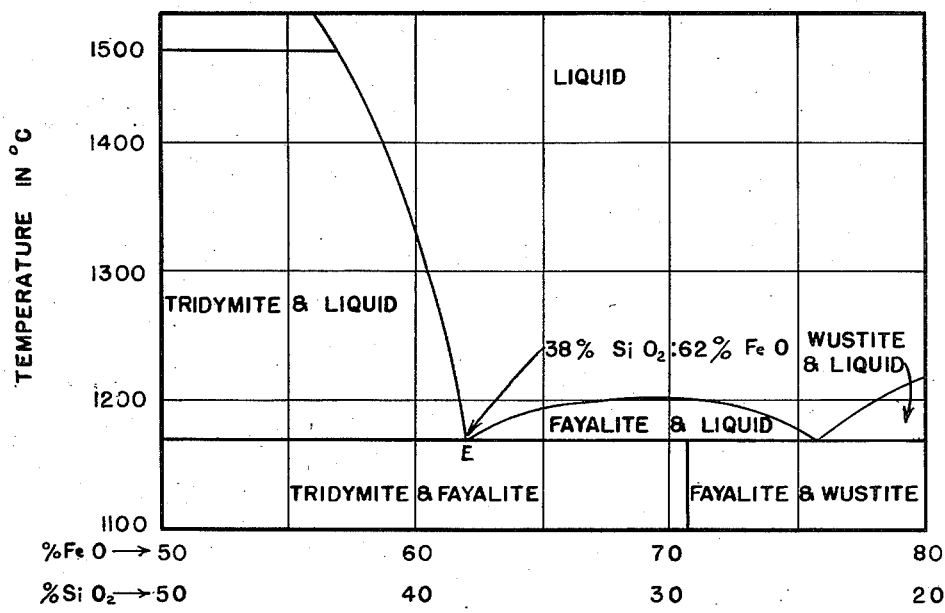
Figure 3 is a silica-ferrous oxide equilibrium diagram.

Not only does the percentage of magnetite reduced depend upon the amount of silicon carbide added, but also it appears to depend upon the ratio between the amounts of silica and ferrous oxide present in the resulting slag, the greatest percentage of magnetite reduction apparently being obtained when this ratio is approximately 38:62 by weight, which ratio corresponds to the eutectic point E on the $SiO_2 \cdot FeO$ equilibrium diagram of Figure 3.

Furthermore, the amount of magnetite reduced by the addition of silicon carbide appears to depend upon the temperature of the material being treated, there being a minimum temperature below which magnetite is not reduced by the addition of silicon carbide, and in general the reduction of magnetite by silicon carbide increasing as the temperature of the slag is increased.

In the preferred practice of the present invention, the silicon carbide is added to the converter slag after it has been removed from the converter but prior to its being introduced into the reverberatory furnace. This can be done advantageously by placing the desired amount of addition agent comprising silicon carbide in the bottom of slag pots into which the molten slag is poured from the converter, thus facilitating intimate mixing of the slag with the silicon carbide. Alternatively the silicon carbide may be added to the slag pot while the slag is being poured thereinto, or after some slag has been poured into the slag pot but before the pouring of slag into the pot has been completed.

As aforementioned, preferably the silicon carbide is added in excess of the amount theoretically required to satisfy the stoichiometric requirements for the complete reduction of the magnetite present in accordance with Equation 1. Furthermore, since the greatest percentage of magnetite reduction is obtained when the silica-ferrous oxide ratio of the slag is in the vicinity of 38:62, when the silico-ferrous oxide ratio of the converter slags is lower than this ratio (as is usually the case), the preferred practice of the present invention includes the addition to the slag from the converter of not only silicon carbide but also of silica in any desired form, such as silica sand or highly siliceous metal-bearing ores. The silica should be added in sufficient amount to bring the silica-ferrous oxide ratio of the resulting slag approximately up to 38:62 by weight. In adding silica, care must be taken not to add it in such an amount as to raise the silica-ferrous oxide ratio substantially over the optimum 38:62 ratio because it has been found that such excessive additions of silica bring about a decrease in the percentage of magnetic reduced.

Also it is within the preferred practice of the present invention to add the silicon carbide-containing addition agent while the temperature of the slag is above 1150° C. and desirably at least about 1200° C. At temperatures of 1150° C. and above the reduction of magnetite by silicon carbide takes place to a very substantial degree.

The silicon carbide and the silica can be added in the form of loose granular material or bonded briquettes, or in any other convenient form for these reactants. In some cases it is advantageous to have the reactants in the form of briquettes of silica sand and silicon carbide in the desired proportions.

The silicon carbide may be of relatively high purity, such as that used in the tests of the following examples, or may contain substantial amounts of impurities. Likewise the purity of the silica is not critical.

To more fully understand the present invention, examples are given showing the effect of various additions to a typical converter slag, having the chemical analysis shown in Table I below:

TABLE I

*Composition of the converter slag*

| $Fe_3O_4$, Percent | $SiO_2$, Percent | $Al_2O_3$, Percent | Fe [1] (total), Percent | CaO, Percent |
|---|---|---|---|---|
| 22.9 | 24.2 | 2.3 | 47.6 | 0.4 |

[1] This includes the Fe present as $Fe_3O_4$.

EXAMPLE I

The theoretical amount of silicon carbide required to completely reduce the magnetite in the above-mentioned converter slag was calculated based on the assumption that the Equation 1 takes place at the temperature of 1300° C. It was determined that an addition of an amount of silicon carbide equal to 1.32% by weight of the slag to be treated is theoretically required to completely reduce all the magnetite contained in this converter slag. This amount and various multiples of this amount of loose granular silicon carbide of 98% purity were mixed with samples of crushed slag. The mixtures of slag and silicon carbide were then fused by heating to a temperature of 1300° C., the heating requiring about 20 minutes. The temperature of 1300° C. was maintained for about 10 minutes to permit completion of the reaction, after which the slag was cooled and analyzed to determine the decrease in the percentage of magnetite in the resultant slag. No silica was added to the slag samples during these tests. Table II below and the graph of Figure I show the effectiveness of additions of only silicon carbide in various amounts for decreasing the amount of magnetite in the slag.

TABLE II

| SiC Added, Percent | Magnetite in Slag | | Magnetite Reduced, Percent |
|---|---|---|---|
| | Before Fusion, Percent | After Fusion, Percent | |
| 1.32 | 22.9 | 9.4 | 58.9 |
| 2.64 | 22.9 | 5.0 | 78.2 |
| 3.96 | 22.9 | 3.0 | 87.0 |

From the results of these tests, as tabulated above, it is apparent that the addition of silicon carbide, without the addition of any silica, brings about a very substantial reduction in the amount of magnetite in the slag. These tests also clearly show that, while the addition of the amount of silicon carbide theoretically required to satisfy the stoichiometric requirements of Equation 1, namely 1.32% or 1/17 of the amount of magnetite present in the slag, brings about a large decrease in the percentage of magnetite present in the slag, twice and three times the theoretical requirements, or 2.64% and 3.96% respectively, bring about much greater reductions of magnetite, 87% of the magnetite present in the slag having been reduced by the addition of three times the theoretical requirement of silicon carbide, without the addition of any silica.

EXAMPLE II

Figure 1:
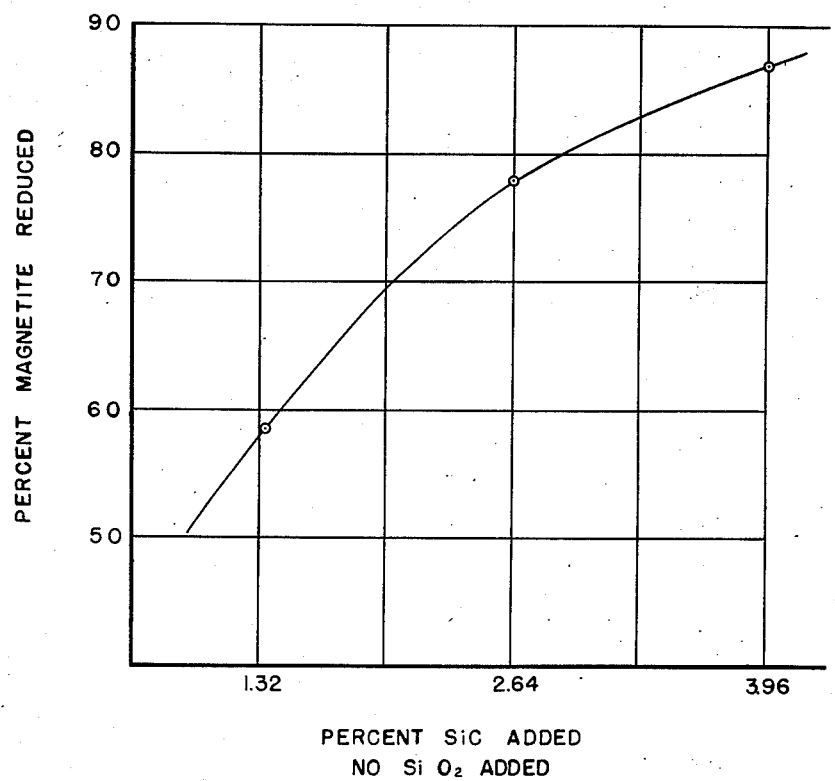
Figure 1 is a graph showing the effect of various amounts of silicon carbide added to converter slag on the percentage of magnetite reduced, no silica being added, the slag being heated to 1300° C.
Figure 2:
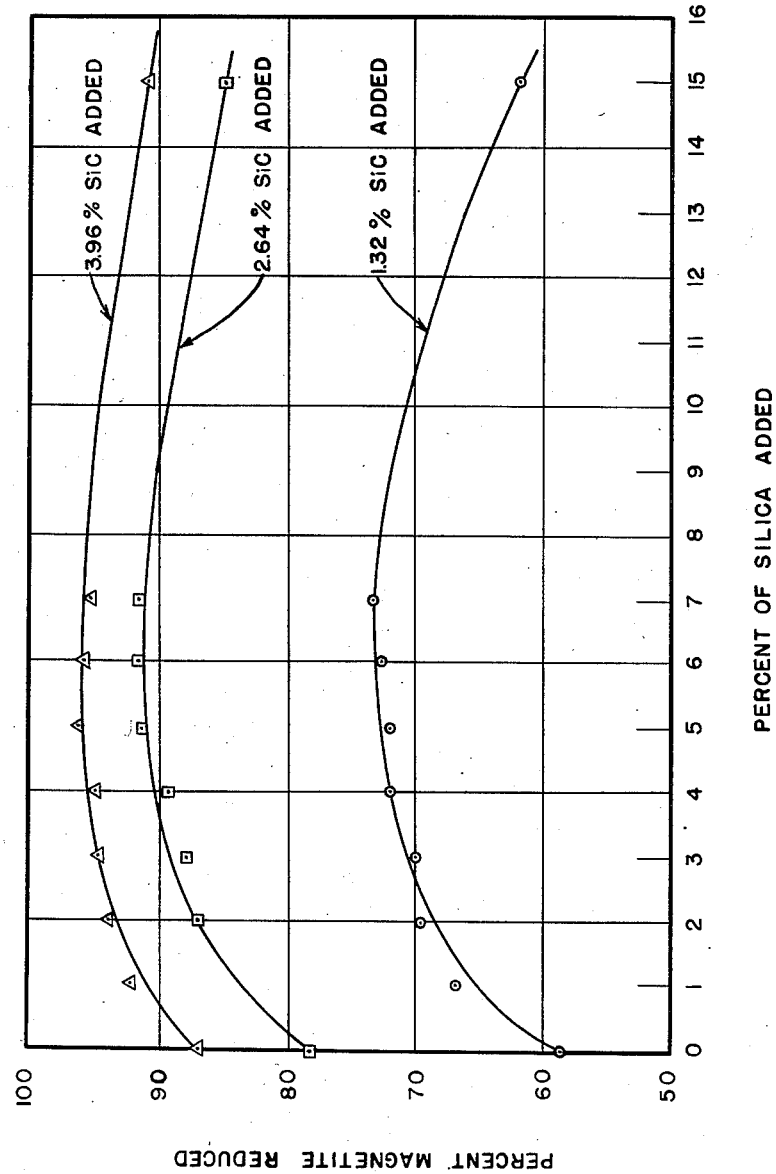
Figure 2 is a graph showing the effect on the percentage of magnetite reduced of various amounts of silica added along with constant amounts of silicon carbide to converter slag, the slag being heated to 1300° C.

To determine the effect of adding silica along with silicon carbide to converter slag, tests similar to those described in Example I were made but with the addition to the crushed slag not only of silicon carbide but also of varying amounts of silica. Three series of tests were run. In the first series an addition of 1.32% of silicon carbide, or the theoretically required amount to completely reduce all the magnetite in the slag, was added to a number of slag samples along with various amounts of silica. In the second series an addition of 2.64% of silicon carbide, or twice the theoretically required amount, was added to a number of samples along with various amounts of silica. In the third series of tests an addition of 3.96% of silicon carbide, or three times the theoretically required amount, was added to a number of samples along with various amounts of silica. The results of these three series of tests are given in Table III below and are graphically shown in Figure 2.

TABLE III

| Reagents Added | | Magnetite in Slag | | Magnetite Reduced, Percent |
|---|---|---|---|---|
| SiC, Percent | $SiO_2$, Percent | Before Fusion, Percent | After Fusion, Percent | |
| 1.32 | 0 | 22.9 | 9.4 | 58.9 |
| 1.32 | 1 | 22.9 | 7.5 | 67.2 |
| 1.32 | 2 | 22.9 | 6.9 | 69.9 |
| 1.32 | 3 | 22.9 | 6.8 | 70.0 |
| 1.32 | 4 | 22.9 | 6.4 | 72.0 |
| 1.32 | 5 | 22.9 | 6.4 | 72.0 |
| 1.32 | 6 | 22.9 | 6.3 | 72.5 |
| 1.32 | 7 | 22.9 | 6.1 | 73.3 |
| 1.32 | 15 | 22.9 | 8.7 | 62.0 |
| 2.64 | 0 | 22.9 | 5.0 | 78.2 |
| 2.64 | 1 | 22.9 | 3.9 | 83.0 |
| 2.64 | 2 | 22.9 | 2.8 | 87.7 |
| 2.64 | 3 | 22.9 | 2.5 | 89.1 |
| 2.64 | 4 | 22.9 | 2.4 | 89.5 |
| 2.64 | 5 | 22.9 | 2.0 | 91.3 |
| 2.64 | 6 | 22.9 | 2.0 | 91.3 |
| 2.64 | 7 | 22.9 | 2.0 | 91.3 |
| 2.64 | 15 | 22.9 | 3.4 | 85.2 |
| 3.96 | 0 | 22.9 | 3.0 | 87.0 |
| 3.96 | 1 | 22.9 | 1.7 | 92.6 |
| 3.96 | 2 | 22.9 | 1.4 | 93.9 |
| 3.96 | 3 | 22.9 | 1.3 | 94.3 |
| 3.96 | 4 | 22.9 | 1.2 | 94.8 |
| 3.96 | 5 | 22.9 | 0.8 | 96.5 |
| 3.96 | 6 | 22.9 | 0.8 | 96.5 |
| 3.96 | 7 | 22.9 | 1.1 | 95.2 |
| 3.96 | 15 | 22.9 | 2.0 | 90.9 |

The results of these three series of tests indicate that, regardless of whether one, two, or three times the theoretically required amount of silicon carbide is added, increasing the silica additions up to about 7 percent results in an increase in the amount of magnetite reduced in this particular slag. With the theoretically required amount of silicon carbide added, the magnetite reduction increased from 58.9% when no silica was added to 73.3% when 7% silica was added along with the silicon carbide. With twice the theoretically required amount of silicon carbide added, the magnetite reduction increased from 78.2% when no silica was added to 91.3% when 7% silica was added along with the silicon carbide. And with three times the theoretically required amount of silicon carbide added, the magnetite reduction increased from 87.0% when no silica was added to 95.2% when 7% silica was added along with the silicon carbide. However, in each series of tests further increasing the amount of silica added to 15% resulted in a substantial decrease in the amount of magnetite reduced, compared to the amount reduced when only 7% silica was added.

By determining the silica to ferrous oxide ratio of the treated test slags, making proper allowance for the silica and iron oxides present in other compounds such as magnetite, hercynite, and anorthite, it was found that in all three series of tests a 7% or smaller addition of silica gave a resultant slag which had a silica to ferrous oxide ratio less than 38:62, the ratio of the eutectic E shown on the silica-ferrous oxide equilibrium diagram of Figure 3. However, in each case where 15% silica was added the resultant slag had a silica to ferrous oxide ratio higher than the eutectic ratio of 38:62. It therefore appears that increasing the amount of silica added in conjunction with the silicon carbide added to the slag increases the amount of magnetite reduced approximately up to the point where the resultant slag has a silica to ferrous oxide ratio of 38:62, but that further increasing the silica additions beyond this point decreases the amount of magnetite reduced. Consequently, where the converter slag to be treated has a silica to ferrous oxide ratio lower than the eutectic ratio of 38:62, it is within the preferred practice of the present invention to add to the slag not only silicon carbide but also silica in amounts approximately equal to or somewhat less than that amount which will give a resultant slag having a silica to ferrous oxide ratio of 38:62. Highly satisfactory results are obtained where the silica to ferrous oxide ratio of the resultant slag is from about 30:70 to about 38:62. The tests where two and three times the theoretical requirement of silicon carbide and from about 4–7% silica were added to this slag are tests demonstrating the preferred practice of the present invention.

While the addition to this particular slag of as little as 7% of silica along with silicon carbide gave a resultant slag having a silica to ferrous oxide ratio of approximately 38:62, making proper allowance for the silica and iron oxide in other compounds, where the slag to be treated has a silica to ferrous oxide ratio lower or higher than that shown in Table I, the preferred practice is to add sufficient silica to give a silica to ferrous oxide ratio of between 38:62 and 30:70.

EXAMPLE III

Figure 4:
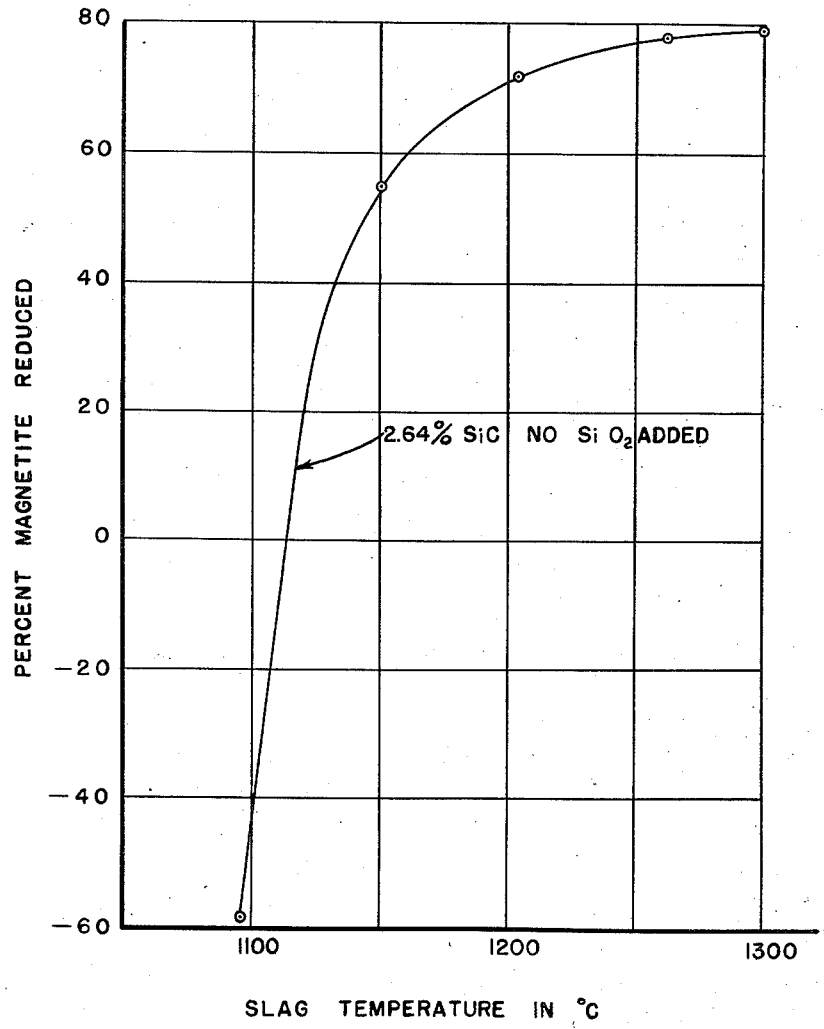
Figure 4 is a graph showing the effect of slag temperature on the reduction of magnetite in converter slag by silicon carbide.

To determine the effect of slag temperature at the time of the addition of silicon carbide on the reduction of magnetite, tests similar to those described in Example I were made, but with fixed silicon carbide additions and different final temperatures. No silica was added during these tests. The results of these tests are given in Figure 4 and in Table IV below.

TABLE IV

| SiC Added, Percent | Furnace Temp., °C. | Magnetite in Slag | | Magnetite | |
| --- | --- | --- | --- | --- | --- |
| | | Before Fusion, Percent | After Fusion, Percent | Reduced, Percent | Increased, Percent |
| 2.64 | 1,300 | 22.9 | 5.0 | 78.2 | |
| 2.64 | 1,260 | 22.9 | 5.1 | 77.7 | |
| 2.64 | 1,205 | 22.9 | 6.3 | 72.5 | |
| 2.64 | 1,150 | 22.9 | 10.3 | 55.0 | |
| 2.64 | 1,095 | 22.9 | 36.2 | | 58.1 |

The results of these tests indicate that the percentage of magnetite reduced using silicon carbide as an addition agent varies with the temperature of the slag at the time of the addition. In general it appears that the higher the temperature of the slag, the greater the amount of magnetite reduced. Furthermore, these tests show that for the reduction of magnetite by 2.64% of silicon carbide it is essential that the temperature of the slag be greater than 1095° C., at which temperature the amount of magnetite in the slag increased rather than decreased. In fact the graph of Figure 4 indicates that at all temperatures under about 1115° C. an addition of 2.64% silicon carbide to this slag will not bring about reduction of magnetite in the slag. It is therefore preferable that the temerature of the converter slag to be treated should be above about 1150° C. and desirably should be at least about 1200° C., at which temperature the reduction of magnetite takes place to a very substantial extent upon the addition of silicon carbide.

While the present invention is described as it pertains to using only silicon carbide, with or without silica, as the addition agent for the reduction of magnetite, it is to be pointed out that in some cases it may be advantageous to treat the slag with silicon carbide in conjunction with other addition agents. In any case, it is within the scope of the present invention to use silicon carbide either alone or in conjunction with other materials to reduce magnetite in the production of copper.

Having described the invention, it is desired to claim:

1. In the process of recovering copper from its ores involving smelting the copper ore in a reverberatory furnace to form a matte of mixed copper and iron sulfides, transferring the said matte to a converter and oxidizing the matte therein, withdrawing the converter slag from the converter and transferring it to the reverberatory furnace, the step of adding silicon carbide to the converter slag prior to its being introduced into the reverberatory furnace whereby some of the magnetite in said slag reacts to form ferrous oxide silicate slag.

2. In the process of recovering copper from its ores involving smelting the copper ore in a reverberatory furnace to form a matte of mixed copper and iron sulfides, transferring the said matte to a converter and oxidizing the matte therein, withdrawing the converter slag from the converter and transferring it to the reverberatory furnace, the step of adding silicon carbide and silica to the converter slag prior to its being introduced into the reverberatory furnace whereby some of the magnetite in said slag reacts to form ferrous oxide silicate slag.

3. In the process of recovering copper from its ores involving smelting the copper ore in a reverberatory furnace to form a matte of mixed copper and iron sulfides, transferring the said matte to a converter and oxidizing the matte therein, withdrawing the converter slag from the converter and transferring it to the reverberatory furnace, the step of introducing into the converter slag an addition agent comprising silicon carbide in an amount at least equal by weight to one-seventeenth the amount of magnetite in said slag.

4. In the process of recovering copper from its ores involving smelting the copper ore in a reverberatory furnace to form a matte of mixed copper and iron sulfides, transferring the said matte to a converter and oxidizing the matte therein, withdrawing the converter slag from the converter and transferring it to the reverberatory furnace, the step of introducing into the converter slag an addition agent comprising silica and silicon carbide, said silicon carbide being introduced in an amount at least equal by weight to one-seventeenth the amount of magnetite in said slag.

5. In the process of recovering copper from its ores involving smelting the copper ore in a reverberatory furnace to form a matte of mixed copper and iron sulfides, transferring the said matte to a converter and oxidizing the matte therein, withdrawing the converter slag from the converter and transferring it to the reverberatory furnace, the steps of introducing silicon carbide into a slag pot, withdrawing the slag from the converter into the slag pot whereby the silicon carbide is intimately mixed with the slag resulting in a decrease in the amount of magnetite in the slag, and thereafter introducing the resultant slag into the reverberatory furnace, said silicon carbide being introduced into said slag pot in an amount at least equal by weight to one-seventeenth the amount of magnetite in said slag in said slag pot.

6. The steps in the production of metallic copper from its ores according to claim 5 wherein silica is introduced into the slag pot in an amount sufficient to give a resultant slag in the slag pot having a silica to ferrous oxide ratio of from about 30:70 to 38:62.

7. In the process of recovering copper from its ores involving smelting the copper ore in a reverberatory furnace to form a matte of mixed copper and iron sulfides, transferring the said matte to a converter and oxidizing the matte therein, withdrawing the converter slag from the converter and transferring it to the reverberatory furnace, the step of introducing an addition agent comprising silicon carbide into the converter slag to decrease the amount of magnetite in the converter slag.

References Cited in the file of this patent

UNITED STATES PATENTS

| | | |
|---|---|---|
| 1,822,588 | Fowler et al. | Sept. 8, 1931 |
| 2,444,424 | Brown et al. | July 6, 1948 |

OTHER REFERENCES

"The Physical Chemistry of Cooper Smelting," by Ruddle. Pub. in 1953.